(12) United States Patent
Ridley

(10) Patent No.: US 7,140,631 B2
(45) Date of Patent: Nov. 28, 2006

(54) AUTOMATIC KICK STAND FOR TWO-WHEELED VEHICLE

(75) Inventor: Clay K. Ridley, Oklahoma City, OK (US)

(73) Assignee: Ridley Motorcycle Company, Oklahoma City, OK (US)

( * ) Notice: Subject to any disclaimer, the term of this patent is extended or adjusted under 35 U.S.C. 154(b) by 0 days.

(21) Appl. No.: 11/057,443

(22) Filed: Feb. 14, 2005

(65) Prior Publication Data
US 2005/0179229 A1    Aug. 18, 2005

Related U.S. Application Data

(60) Provisional application No. 60/543,998, filed on Feb. 13, 2004.

(51) Int. Cl.
*B62H 1/02* (2006.01)
(52) U.S. Cl. ..................................... 280/301
(58) Field of Classification Search ................ 280/293, 280/301
See application file for complete search history.

(56) References Cited

U.S. PATENT DOCUMENTS

| | | | | |
|---|---|---|---|---|
| 4,084,656 A | | 4/1978 | Itoh et al. ............... | 180/103 R |
| 4,223,906 A | * | 9/1980 | Gratza ........................ | 280/301 |
| 4,638,880 A | * | 1/1987 | Togashi ...................... | 180/219 |
| 4,693,488 A | * | 9/1987 | Bernocco .................... | 280/293 |
| 5,234,225 A | * | 8/1993 | Yaple ......................... | 280/293 |
| 5,628,379 A | * | 5/1997 | Watkins ...................... | 180/209 |
| 6,196,567 B1 | | 3/2001 | Lynam et al. ............ | 280/288.4 |
| 6,679,054 B1 | * | 1/2004 | Doveri ......................... | 60/474 |

FOREIGN PATENT DOCUMENTS

| | | |
|---|---|---|
| DE | 100 13 458 A1 | 9/2000 |
| FR | 2 572 046 A1 | 4/1986 |
| FR | 2 748 982 A1 | 11/1997 |
| JP | 9-039861 A | 2/1997 |

* cited by examiner

*Primary Examiner*—Kevin Hurley
(74) *Attorney, Agent, or Firm*—Tomlinson & O'Connell, PC

(57) ABSTRACT

An automated side stand for a two wheeled vehicle. A side stand assembly comprises a rotatable strut and an actuator attachable to the frame of a vehicle having two wheels. The actuator operates to rotate the strut between an up position and a down position. In the down position, the strut comes in contact with the ground and maintains the vehicle in a substantially upright position. The side stand assembly may sense when a transmission of the vehicle is in a neutral position and allow operation of the assembly only in neutral. When the vehicle is not in neutral, the actuator moves the strut to the up position and locks the side stand assembly.

16 Claims, 2 Drawing Sheets

AUTOMATIC KICK STAND FOR TWO-WHEELED VEHICLE

CROSS REFERENCE TO RELATED APPLICATION

This application claims the benefit of U.S. Provisional Application No. 60/543,998, filed on Feb. 13, 2004, the contents of which are incorporated herein fully by reference.

FIELD OF THE INVENTION

The present invention relates to a two-wheel vehicle, for example, a motorcycle or a scooter. More particularly, the invention related to a two-wheel vehicle with an automatically-activated side stand.

BACKGROUND

A two-wheel vehicle may have a side stand, a center stand, or both, which rotate relative to the vehicle from between a "down" position and an "up" position. When the vehicle rider controls the vehicle motion, the side stand or center stand is usually maintained in the up position. When the rider dismounts from the vehicle, the side stand or center stand is usually maintained in the down position to keep the vehicle in a substantially upright position. In this position, the vehicle typically contacts the ground at three points.

A center stand typically has two points for contacting the ground. While the center stand is deployed in the down position, one of the vehicle wheels rises. The three points of contact of the vehicle with the ground is the one wheel that did not rise and the two contact points of the center stand. The center stand may be designed to have a horizontal bar at the lowermost position where the center stand contacts the ground. In such a case, only two parts of the vehicle, one wheel and the horizontal bar of the center stand, contact the ground.

A side stand generally has one point for contacting the ground. When the side stand is deployed in the down position, the vehicle tilts slightly to the side where the side stand is. In such a case, the vehicle's three points of contact with the ground are the two wheels and the lowermost point of the side stand.

The side stand is typically rotated between the up position and down position by the rider exerting a force with his foot. Hence, the side stand is commonly referred to as a "kick-stand."

SUMMARY OF THE INVENTION

The present invention is directed to a side stand assembly for a vehicle having two wheels joined by a frame. The said side stand assembly comprises a first frame mount, a strut pivotally attached to the first frame mount, and an actuator configured to movably attach to the strut. The actuator is operative to rotate the strut between a down position and an up position.

In an alternative embodiment, the present invention is for a vehicle comprising two wheels, a frame configured to join the two wheels, and a side stand assembly. The side stand assembly comprises a first frame mount attachable to the frame, a rotatable strut configured to pivotally attach to the first frame mount, and an actuator attachable to the frame. The actuator is configured to movably connect to the rotatable strut and is operative to rotate the strut between a down position and an up position.

In yet another embodiment, the present invention comprises a method for operating a side stand assembly for a two-wheeled vehicle. The method comprises the steps of sensing when a transmission of the vehicle is not in a neutral position, moving a strut of the side stand assembly to an up position, and locking the strut of the side stand assembly in the up position.

DETAILED DESCRIPTION OF THE PREFERRED EMBODIMENTS

Figure 1:
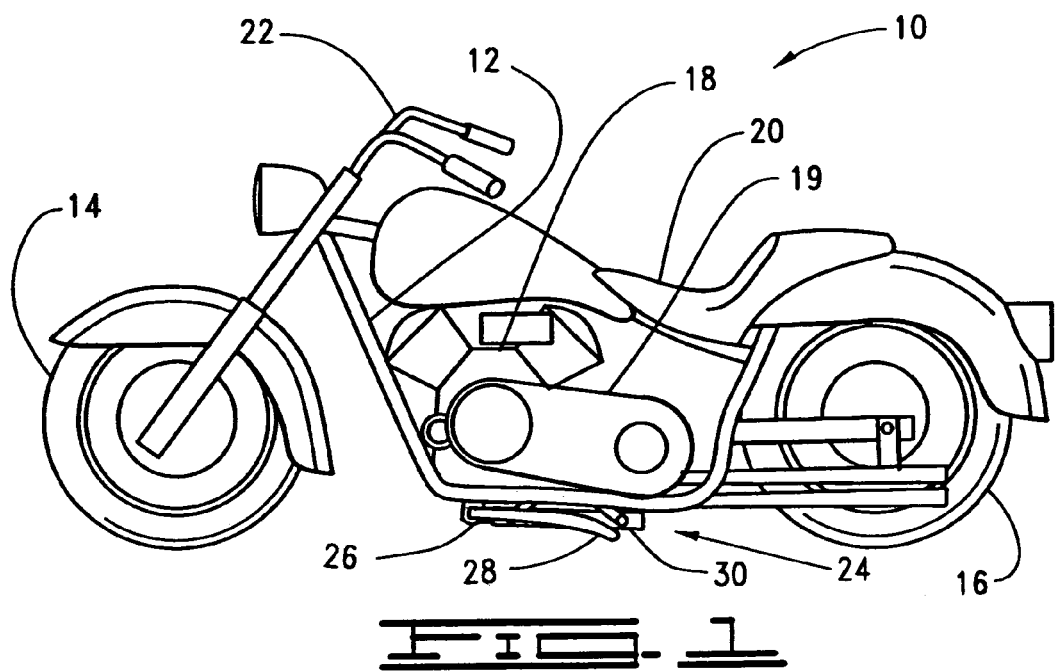
FIG. 1 illustrates a side elevation of a two-wheeled vehicle having a kick-stand built in accordance with the present invention.

With reference now to the drawings in general, and to FIG. 1 in particular, there is shown therein a two-wheeled vehicle 10, for example, a motorcycle or a scooter. The vehicle 10 comprises a frame 12 joining a front wheel 14 and a rear wheel 16. An engine 18 supported by the frame 12 provides power for the vehicle 10. The vehicle 10 further comprises a transmission 19 supported by the frame 10; the transmission comprising at lease one gear and a neutral position for use in operating the vehicle. A rider/operator (not shown) generally straddles the frame 12, sitting on a seat 20 and gripping a set of handlebars 22 supported on the frame. The vehicle 10 also comprises an automatic side stand assembly 24 attachable to the frame 12.

Figure 2:
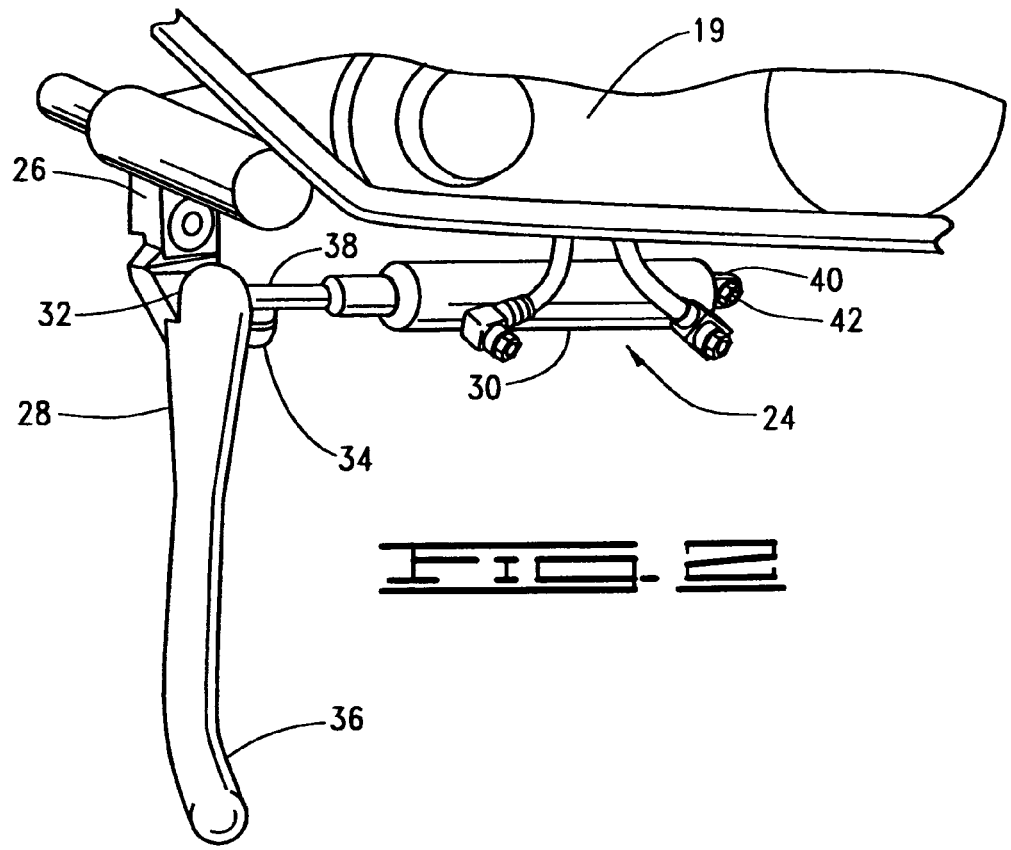
FIG. 2 is a partial view of the vehicle of FIG. 1, showing the kick-stand in a down position.

The side stand assembly 24 comprises a first frame mount 26, a strut 28, and an actuator 30. The first frame mount 26 is attachable to the frame 12. As shown in FIG. 2, the first frame mount 26 is preferably secured to the frame 12 at a bottom of the frame and proximate a mid-line of the frame. The first frame mount 26 may be attached to the frame 12 on either a left side or a right side of the frame. Generally, and as shown in FIGS. 1 and 2, the mount 26 is secured to the left side of the frame 12.

With continued reference to FIG. 2, the strut 28 comprises a pivot point 32, a pivot arm 34 and a base 36. The strut 28 is pivotally attached to the first frame mount 26 at the pivot point 32. Preferably, the strut 28 is rotatable between an up position, (as shown in FIG. 1,) and a down position, as shown in FIG. 2. In the down position, the base 36 of the strut 28 is positioned to come in contact with the ground as the vehicle 10 is leaned to the left side. When the base 36 contacts the ground, the vehicle 10 is maintained in a substantially upright position with the front wheel 14, the rear wheel 16, and the base 36 of the strut 28 as the three contact points with the ground.

The actuator 30 operates to move the pivot arm 34 of the strut 28 so that the strut rotates about the pivot point 32. Preferably, the actuator 30 has a first end 38 and a second end 40. The actuator 30 is pivotally attached to the pivot arm 34 of the strut 28 at the first end 38 of the actuator. Preferably, the actuator 30 attaches to the pivot arm 34 of the rotatable strut 28 via a ball (or "universal") joint. At the second end 40 of the actuator 30, the actuator is attached to the frame 12 of the vehicle 10. Preferably, the actuator 30 is attached to the frame 12 by way of a second frame mount 42.

The second frame mount 42 may be integrally formed with the actuator 30 or may be separately attachable to the frame 12.

Figure 3:
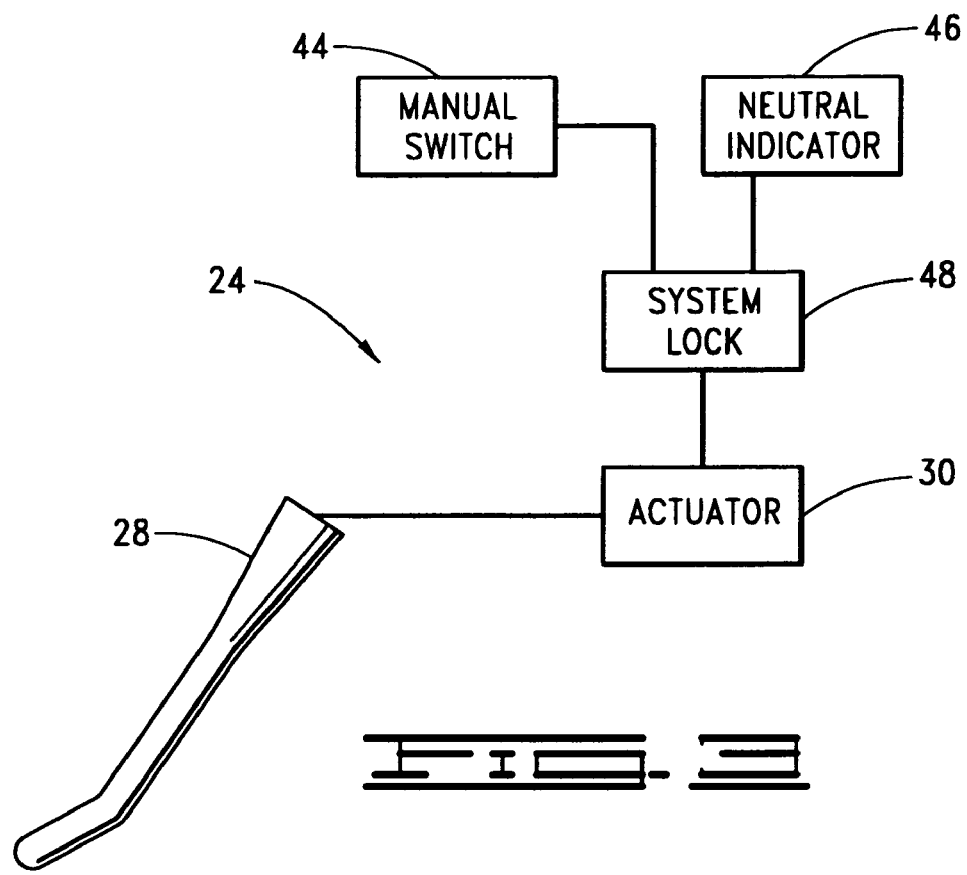
FIG. 3 is a block diagram of the components of the kick-stand of the present invention.

With reference now to FIG. 3, there is shown therein a block diagram for the side stand assembly 24 of the present invention. As shown in the drawing, the side stand assembly 24 further comprises a manually operated activation switch 44, a neutral indicator 46, and a system lock 48. The activation switch 44 is preferably located proximate the handle bars 22 and in a position convenient for access by the rider of the vehicle 10. The activation switch 44 is operatively connected to the system lock 48 and the actuator 30. By pressing or moving the switch 44, the rider can operate the side stand assembly 24 to move the strut 28 between the up position and the down position. In the preferred embodiment, the switch 44 comprises a first button to move the strut 28 to the up position and a second button to move the strut to the down position.

The neutral indicator 46 is operatively connectable to the vehicle 10 and, more preferably, to the transmission 19. The neutral indicator 46 functions to indicate when the transmission 19 of the vehicle is in a neutral position. In a preferred embodiment, the neutral indicator 46 is an indicator light (not shown) located proximate the handle bars 22 and operatively connected to the transmission 19.

The system lock 48 is operatively connected to the actuator 30, the activation switch 44, and the neutral indicator 46. The system lock 48 functions to permit the actuator 30, and the side stand assembly 24, to be operative only when the vehicle 10 is in neutral. When the neutral indicator 46 indicates that the vehicle 10 is in gear and not in neutral, the system lock 48 causes the actuator 30 to move the strut 28 to the up position and then lock the actuator. If the neutral indicator 46 indicates the vehicle 10 is in neutral, the system lock 48 allows the activation switch 44 to communicate with the actuator 30 so that the strut 28 can be freely moved between the up position and the down position. In the preferred embodiment, the system lock 48 comprises an electrical relay operatively connected to the activation switch 44, the neutral indicator 46, and the actuator 30.

Figure 4:
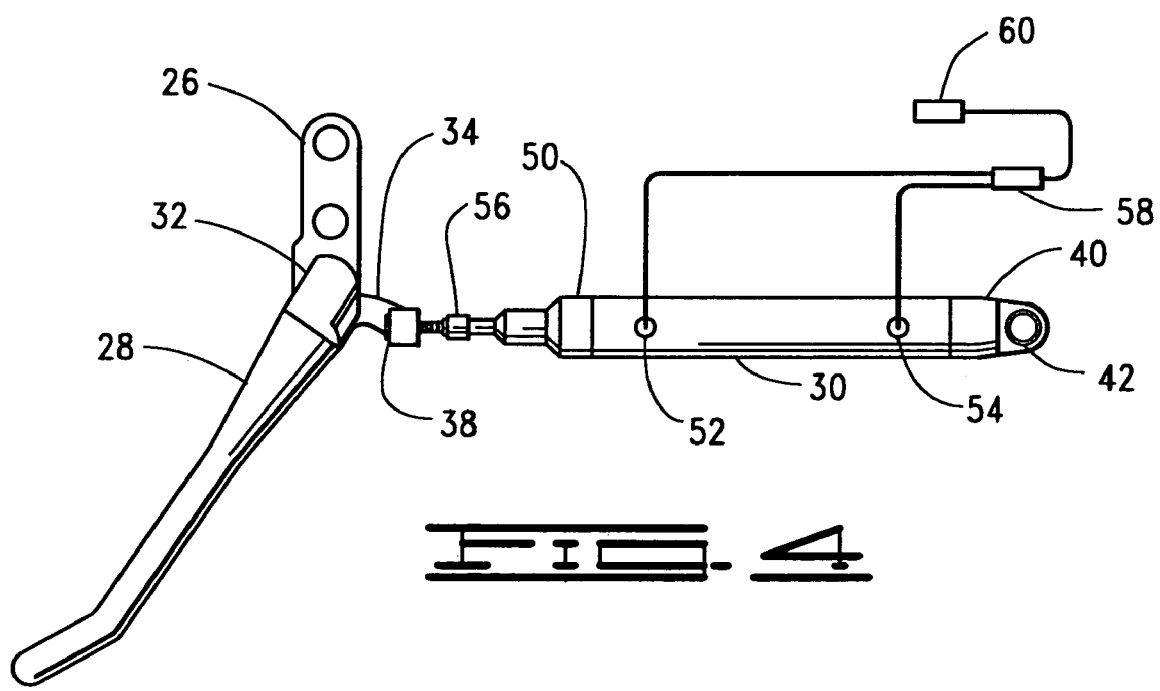
FIG. 4 illustrates the strut and actuator of an embodiment of the present invention.

Referring now to FIG. 4, there is shown therein a preferred embodiment for the actuator 30 and the strut 28 of the side stand assembly 24. In the preferred embodiment, the actuator 30 comprises a fluid actuator. The fluid used may be air, gas, or liquid. More preferably, the actuator 30 comprises a pneumatic actuator. One skilled in the art will appreciate that the actuator 30 may alternatively comprise other fluid actuators such as an hydraulic actuator, or alternatively an electric actuator or other suitable system for pivoting the strut.

The actuator 30 preferably comprises a pneumatically activated cylinder 50 or piston that extends to move the pivot arm 34 of the strut 28. The cylinder 50 further comprises first 52 and second 54 flow control knobs. The flow control knobs 50 and 52 may be used to adjust the rate of retraction and extension of the cylinder 58, and thereby the speed of rotation of the strut 28. The cylinder 50 may further comprise a threaded adjuster 56 for setting a desired amount of rotation for the strut.

With continued reference to FIG. 4, the actuator 30 further comprises a fluid switch 58 and a pump 60 or a fluid-reserve tank, or both. The switch 58 is operatively connected to the cylinder 50 and is adapted to cause the actuator 30 to operate between a first and second mode. In the first mode, the cylinder 50 retracts to pivot the strut 28 to the down position. In the second mode, the cylinder 50 extends to pivot the strut 28 to the up position. In the preferred embodiment, the switch 58 operates to direct a fluid, compressed air, to the cylinder 50 so that the cylinder retracts or extends as appropriate.

The pump 60 or fluid tank is adapted to supply fluid to the actuator 30. In the preferred embodiment the pump 60 is an air compressor. A fluid or air reservoir, not shown, may be used to provide fluid to the pump 60 or cylinder 50. The compressor may also be connected to a pressure switch, not shown. The pressure switch functions to maintain pressurized air from the compressor at a predetermined level. Preferably, the air pressure is maintained at approximately 70 psi. Use of the pressure switch functions as a safety feature so that the vehicle rider's foot does not inadvertently get caught and injured when the strut is moved to the up position.

By describing example embodiments of the invention, it is apparent that various alterations, modifications, and improvements will readily occur to those skilled in the art. Such modifications, and improvements, though not expressly described above, are nonetheless intended and implied to be within the spirit and scope of the invention. Accordingly, the foregoing discussion is intended to be illustrative only.

The invention claimed is:

1. A side stand assembly for a vehicle having two wheels joined by a frame, the side stand assembly comprising:
   a first frame mount;
   a strut pivotally attached to the first frame mount; and
   an actuator configured to movably attach to the strut;
   wherein the actuator is operative to rotate the strut between a down position and an up position, such that when the strut is in the down position the strut contacts the ground at a single point; and
   wherein the strut is movable between the down position and the up position without operator assistance.

2. The side stand assembly according to claim 1, wherein said actuator comprises a fluid actuator.

3. The side stand assembly according to claim 2, wherein said fluid actuator comprises a pneumatic actuator.

4. The side stand assembly according to claim 2, further comprising:
   a pump adapted to supply a fluid to the actuator; and
   a switch adapted to cause the actuator to operate between a first mode in which the strut is in the down position and a second mode in which the strut is in the up position.

5. The side stand assembly according to claim 2, further comprising:
   a fluid tank adapted to supply fluid to the actuator; and
   a fluid switch adapted to direct fluid from the tank to the actuator such that the actuator operates between a first mode in which the strut is in the down position and a second mode in which the strut is in the up position.

6. The side stand assembly of claim 1 wherein the actuator further comprises a second frame mount.

7. The side stand assembly of claim 1 further comprising a system lock, the system lock adapted to cause the actuator to rotate the strut to the up position and further adapted to lock the actuator.

8. The side stand assembly of claim 7 wherein the system lock comprises an electrical relay.

9. A side stand assembly for a vehicle having two wheels joined by a frame, the side stand assembly comprising:

a first frame mount;
a strut pivotally attached to the first frame mount; and
an actuator configured to movably attach to the strut;
wherein the actuator is operative to rotate the strut between a down position and an up position; and
wherein the actuator further comprises at least one speed adjustment adapted to control a rate at which the strut rotates between the up position and the down position.

10. A vehicle comprising:
two wheels;
a frame configured to join said two wheels; and
a side stand assembly, said side stand assembly having:
a first frame mount attachable to the frame;
a rotatable strut configured to pivotally attach to the first frame mount; and
an actuator attachable to the frame, said actuator configured to movably connect to the rotatable strut;
wherein the actuator is operative to rotate the strut between a down position and an up position:
wherein when the strut is in the down position the vehicle has three contact points with the ground, the three contact points comprising the two wheels and the strut.

11. The vehicle according to claim 10, wherein said actuator comprises a fluid actuator.

12. The vehicle according to claim 11, wherein said fluid actuator comprises a pneumatic actuator.

13. The vehicle according to claim 11, further comprising:
a pump adapted to supply a fluid to the actuator; and
a switch adapted to cause the actuator to operate between a first mode in which the strut is in the down position and a second mode in which the strut is in the up position.

14. The vehicle according to claim 11, further comprising:
a fluid tank adapted to supply fluid to the actuator; and
a fluid switch adapted to direct fluid from the tank to the actuator such that the actuator operates between a first mode in which the strut is in the down position and a second mode in which the strut is in the up position.

15. The vehicle according to claim 10 further comprising:
a transmission having at least one gear and a neutral position; and
a side stand lock operative when the transmission is not in the neutral position, the side stand lock adapted to cause the actuator to rotate the strut to the up position and to lock the actuator.

16. The vehicle of claim 15 wherein the side stand lock comprises a relay operatively connected to a neutral indicator, the neutral indicator adapted to indicate when the transmission is in the neutral position.

* * * * *